US012580521B2

(12) United States Patent
Shimo et al.

(10) Patent No.: US 12,580,521 B2
(45) Date of Patent: Mar. 17, 2026

(54) SOLAR MODULE SYSTEM, SOLAR SYSTEM, AND MOUNTING METHOD

(71) Applicant: KABUSHIKI KAISHA TOSHIBA, Tokyo (JP)

(72) Inventors: Shunsuke Shimo, Kawasaki Kanagawa (JP); Masaya Yamamitsu, Kamakura Kanagawa (JP); Masayuki Matsutake, Yokohama Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 126 days.

(21) Appl. No.: 18/465,274

(22) Filed: Sep. 12, 2023

(65) Prior Publication Data

US 2024/0266997 A1      Aug. 8, 2024

(30) Foreign Application Priority Data

Feb. 8, 2023      (JP) ................................. 2023-017817

(51) Int. Cl.
$H02S\ 40/34$       (2014.01)
$H02S\ 30/10$       (2014.01)

(52) U.S. Cl.
CPC .............. *H02S 40/34* (2014.12); *H02S 30/10* (2014.12)

(58) Field of Classification Search
None
See application file for complete search history.

(56) References Cited

U.S. PATENT DOCUMENTS

| | | | |
|---|---|---|---|
| 11,750,144 B2 | 9/2023 | Sawada | |
| 2018/0301578 A1* | 10/2018 | Rozbicki | ................. H10F 30/10 |
| 2019/0267933 A1* | 8/2019 | Janowski | .................. E06B 9/24 |
| 2020/0144960 A1 | 5/2020 | Davy | |
| 2020/0335640 A1 | 10/2020 | Millard | |
| 2022/0298851 A1 | 9/2022 | Wakao | |

FOREIGN PATENT DOCUMENTS

| | | |
|---|---|---|
| CN | 113260767 A | 8/2021 |
| DE | 10 2019 124 375 A1 | 3/2021 |
| JP | 2000-64738 A | 2/2000 |
| JP | 2001-323625 A | 11/2001 |
| JP | 3995395 B2 | 10/2007 |
| JP | 2013-175695 A | 9/2013 |
| JP | 2014-175402 A | 9/2014 |
| JP | 5637504 B2 | 12/2014 |

(Continued)

OTHER PUBLICATIONS

English machine translation of Park (KR-102237579-B1) provided by the EPO website, All Pages, 2025. (Year: 2025).*

*Primary Examiner* — Daniel P Malley, Jr.
(74) *Attorney, Agent, or Firm* — Finnegan, Henderson, Farabow, Garrett & Dunner, LLP

(57) ABSTRACT

According to one embodiment, a solar module system includes: a support member that has a principal surface; a solar module arranged on the principal surface; a first terminal arranged on the support member and electrically connected with an electrode of the solar module; a frame member configured to hold the support member such that the solar module opposes to a transparent member; and a second terminal arranged on the frame member and electrically connected with the first terminal of the support member being held by the frame member.

10 Claims, 11 Drawing Sheets

(56) References Cited

FOREIGN PATENT DOCUMENTS

| JP | 2021-99018 | A | 7/2021 |
| JP | 6928701 | B2 | 9/2021 |
| JP | 2021-174929 | A | 11/2021 |
| KR | 10-2012-0027886 | A | 3/2012 |
| KR | 102237579 | B1 * | 4/2021 ............. H01R 13/10 |

* cited by examiner

SOLAR MODULE SYSTEM, SOLAR SYSTEM, AND MOUNTING METHOD

CROSS REFERENCE TO RELATED APPLICATIONS

This application is based upon and claims the benefit of priority from the prior Japanese Patent Application No. 2023-017817, filed on Feb. 8, 2023, the entire contents of which are incorporated herein by reference.

FIELD

Embodiments described herein relate to a solar module system, a solar system, and a mounting method.

BACKGROUND

With a recent increasing demand for solar power generation, an attempt to increase the amount of power generation has been made by placing a solar cell (or battery) or a solar module not only on roofs or roof tops but also on windows of structures.

In one example of proposed methods for placing a solar cell on windows, a hole or hollow is formed on a window and a solar cell is embedded in the hole or hollow. However, such a method may lead to the degradation of functions of the window such as heat resistance and/or mechanical resistance.

There is another idea of embedding a solar cell inside window glass. However, if lifespans of a solar cell and window glass do not match, both the solar cell and window glass have to be replaced when either one of them has passed, which is uneconomical. In addition, to retrofit a solar cell on an already-existing window, it is necessary to replace window glass of the already-existing window with one having a solar cell embedded therein, which leads to an increase of work costs.

There has been another method proposed in which a member having a solar cell embedded therein is mounted independently of a window. In this method, although it is easy to mount and remove a member having a solar cell embedded therein, it is necessary for a person with expertise to perform a connection work for taking out an output of the solar cell to the outside.

DETAILED DESCRIPTION

Figure 1:
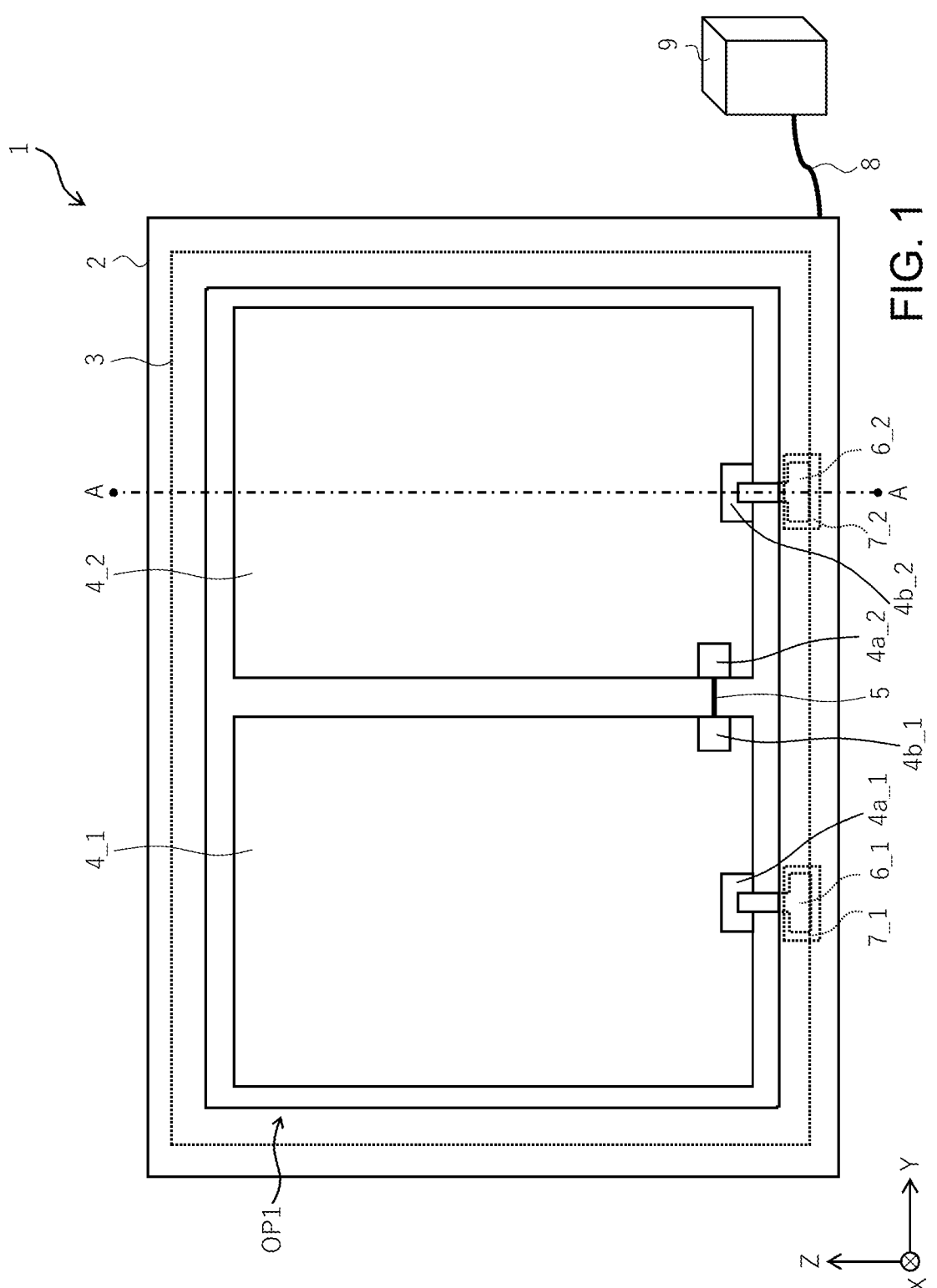
FIG. 1 is a front view of a solar module system according to one embodiment.

According to one embodiment, a solar module system includes: a support member that has a principal surface; a solar module arranged on the principal surface; a first terminal arranged on the support member and electrically connected with an electrode of the solar module; a frame member configured to hold the support member such that the solar module opposes to a transparent member; and a second terminal arranged on the frame member and electrically connected with the first terminal of the support member being held by the frame member.

Hereinafter, an embodiment of the present invention will be described with reference to the drawings. The embodiment is not restrictive of the present invention. The drawings are schematic or conceptual and a ratio between portions or the like is not necessarily the same as the actual one. In the description and drawings, the same components as the ones described earlier for aforementioned drawings are denoted by the same reference signs to appropriately omit detailed description thereof.

The rectangular coordinate system of X, Y, and Z axes are adopted for convenience of description, as illustrated in the drawings and the like.

Figure 2:
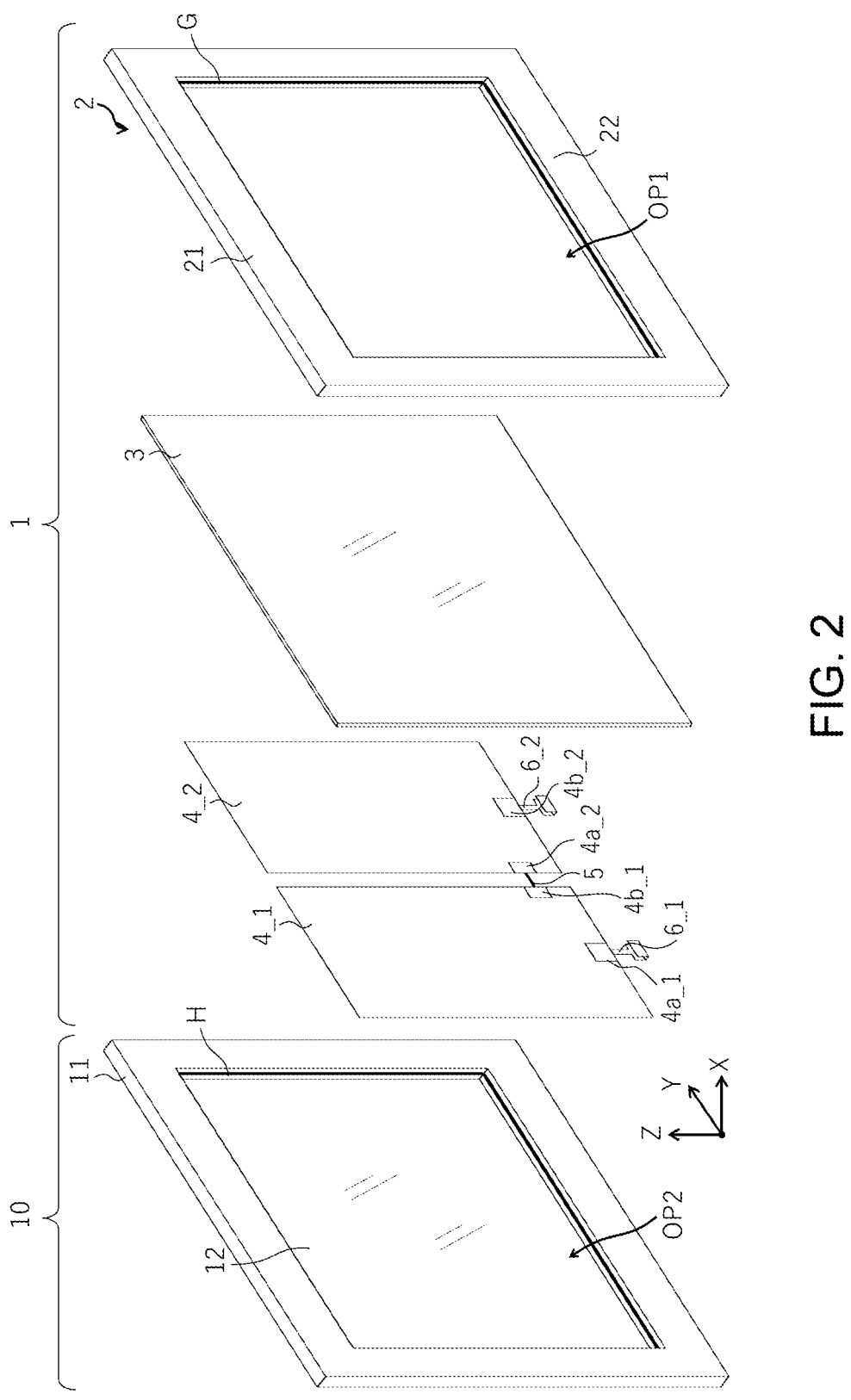
FIG. 2 is an exploded perspective view of the solar module system according to the embodiment.
Figure 3:
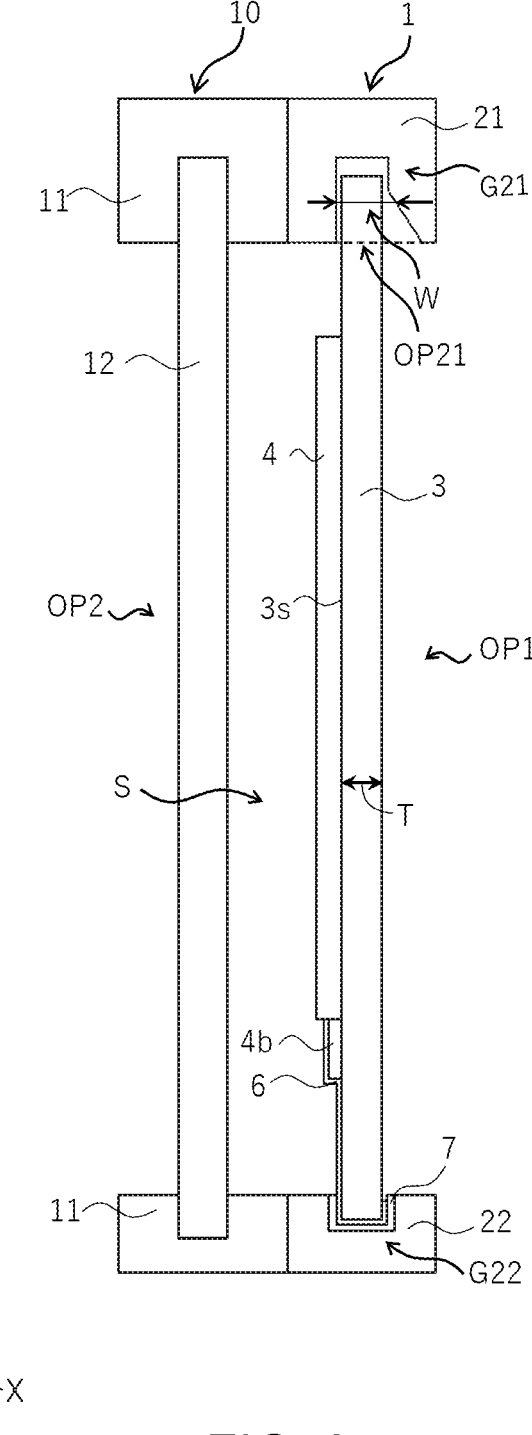
FIG. 3 is a cross-sectional view of the solar module system according to the embodiment.

FIG. 1 is a front view of a solar module system 1 (a view from the side of a solar module 4) according to an embodiment that is installed on an already installed window 10 (see FIG. 2). FIG. 2 is an exploded perspective view of the solar module system 1, which is illustrated in FIG. 1, and the window 10. FIG. 3 is a cross-sectional view (cross-sectional view along line A-A in FIG. 1) of the solar module system 1 and the window 10.

The solar module system 1 includes a frame member 2, a support member 3, a solar module 4 (or a solar battery), wiring 5, a terminal 6, a terminal 7, wiring 8, and a junction box 9. In this example, two solar modules 4_1 and 4_2 are included as the solar module 4; however, the number of solar modules can be one or three or more. When the solar modules 4_1 and 4_2 are not specifically discriminated, they may be described as the solar module 4. The solar module system 1 is arranged to face the window 10. To avoid complication, the wiring 8 and the junction box 9 are not illustrated in FIG. 2 and subsequent FIGs. below. In FIG. 2, the terminal 7 is omitted. In the illustrations of FIG. 1 to FIG. 3, only one solar module system 1 is provided on one window 10; however, a plurality of solar module systems 1 may be provided on one window 10.

The window 10 includes a window frame 11 and a transparent member (window glass) 12. The window frame 11 has an opening OP2 and holds the window glass 12 by having a peripheral portion of the window glass 12 inserted into a groove H that is formed along the opening OP2. The window frame 11 may be a structure itself where the window is installed.

The solar module system 1 may be arranged on the side of a room with respect to the window 10, or may be arranged on an outdoor side. Having the solar module system 1 arranged indoors can prevent the solar module system 1 from being exposed to rain and wind. In a case where it is difficult to carry a solar module indoors because, for example, the solar module is too big, the solar module system 1 may be arranged outdoors. In arranging the solar module system 1 outdoors, its installation location is not limited to a window and may be arranged on an exterior wall.

The frame member 2 has an opening OP1. The frame member 2 has a groove G for holding the support member 3 by having a peripheral portion of the support member 3 inserted into the groove G that is formed along the opening OP1. The frame member 2 can be coupled (connected) with the window frame 11 at at least part of a surface part thereof that opposes (faces) to the window frame 11 each other. In addition, the frame member 2 may be removable from the window frame 11. That is, the frame member 2 may be detachable from the window frame 11. The frame member 2 may be coupled with the window frame 11 by using a jig or adhesive (not illustrated). In the example of FIG. 2, the frame member 2 has a square shape and includes: two side parts that are horizontal in the Z-axis direction and face each other; and two side parts that are horizontal in the Y-axis direction and face each other. Here, the two side parts that are horizontal in the Y-axis direction and face each other are denoted as side parts 21, 22.

The groove G may be provided at only the minimum required portion for holding the support member 3. As for the square-shaped frame member 2, the groove G may be provided at at least one pair out of the pairs of two facing side parts. For example, the groove G (grooves G21, G22) may be provided only at a first side part 21 and a second side part 22 that opposes to the first side part 21, as illustrated in FIG. 3. Details of the grooves G 21, G22 will be described later.

The support member 3 includes a principal surface 3*s* and has the solar module 4 arranged on the principal surface 3*s*, directly supporting the solar module 4. The support member 3 is detachably arranged on the frame member 2 via the groove G, with the principal surface 3*s* on the side of the window glass 12. The support member 3 may have transparency. The support member 3 can have various shapes according to the shape of the frame member 2. In the following description, the support member 3 is assumed to be square-shaped for simplification.

The support member 3 may be composed of transparent plastic. The support member 3 may include at least one of polycarbonate, vinyl chloride, and polyimide that are flame retardant materials. By using flame-retardant materials for the support member 3, the safety of the solar module 4 against fire or flames can be enhanced. The support member 3 may be of glass, screen, or the like.

The support member 3 has a thickness T. The thickness T is 1 mm or more and 50 mm or less, for example. The thickness T being 1 mm or more can prevent deformation and makes it easy to handle the support member 3. The thickness T being 50 mm or less can reduce its weight and makes it easy to handle the support member 3.

Figure 4:
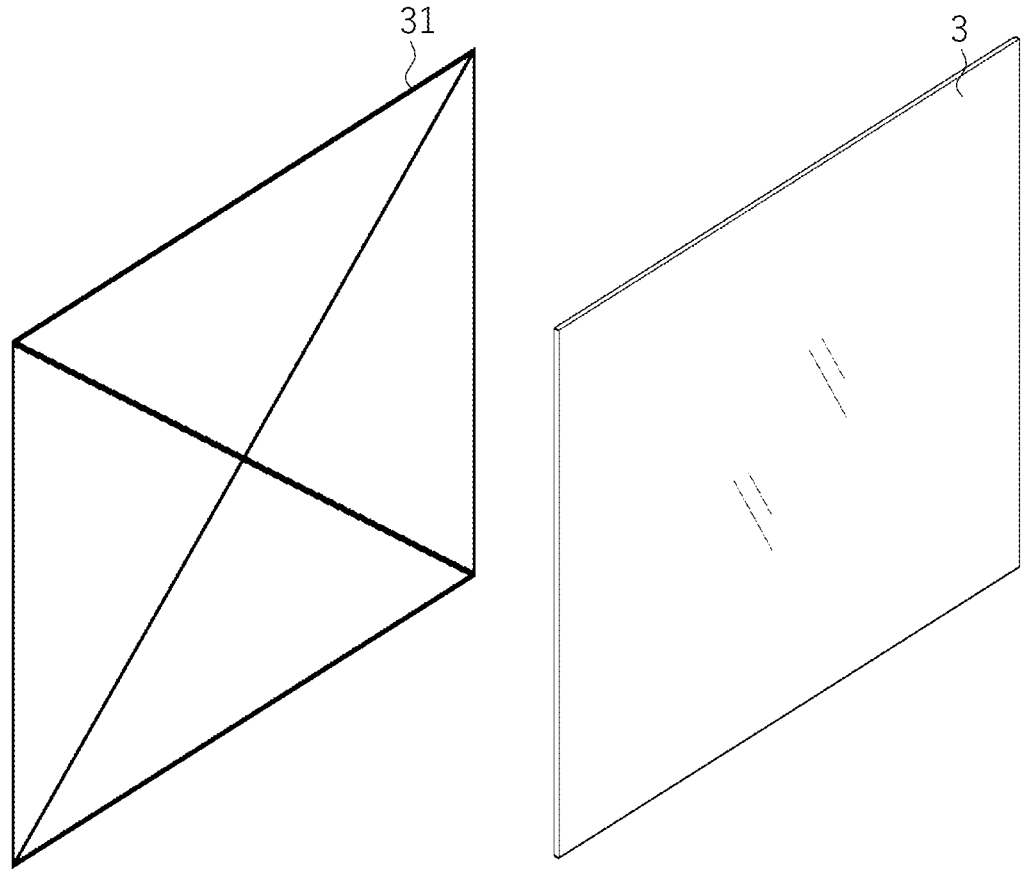
FIG. 4 is an exploded perspective view that illustrates a support member and a reinforcement member included in the support member.

The support member 3 may be provided with a reinforcement member 31 to prevent deformation. FIG. 4 is an exploded perspective view of the support member 3 that is provided with the reinforcement member 31. The reinforcement member 31 is composed by combining members that are along at least either a diagonal line or side part of the support member 3, and is arranged on a surface of the support member 3. The reinforcement member 31 may be embedded inside the support member 3. The reinforcement member 31 may be formed of the same material as that of the support member 3, for example.

The solar module 4 is arranged on (coupled to) the principal surface 3*s* of the support member 3. The solar module 4 may be coupled to the principal surface 3*s* by using tape or the like. Alternatively, the solar module 4 may be arranged by having a hollow formed on the principal surface 3*s* of the support member 3 and having the solar module 4 engaged into the hollow. The solar module 4 may be separatable from the principal surface 3*s*. That is, the solar module 4 may be detachable from the principal surface 3*s* of the support member 3.

Each of two solar modules 4 includes a positive electrode 4*a*_1, 4*a*_2 and a negative electrode 4*b*_1, 4*b*_2. In the following description, the positive electrodes 4*a*_1, 4*a*_2 may be collectively described as a positive electrode 4*a* and the negative electrodes 4*b*_1, 4*b*_2 may be collectively described as the negative electrode 4*b*. The solar module 4 is a single-side light receiving solar cell (or battery) or a double-side light receiving solar cell (or battery). When the solar module 4 is a double-side light receiving solar cell, not only light incident from outside but also light reflected by an indoor wall or the like can be used for power generation.

The solar module 4 may be a monocrystalline silicon solar cell (battery), a polycrystalline silicon solar cell (or battery), an amorphous silicon solar cell (or battery), an organic thin-film solar cell (or battery), a perovskite solar cell (or battery), or any other solar cells (or batteries). In the case of using an organic thin-film solar cell or a perovskite solar cell as the solar module 4, the solar module 4 can be made lighter in weight and this allows the solar module system 1 to be more easily installed.

The solar module 4 is arranged on the principal surface 3*s*, so that the solar module 4 is located between the window glass 12 and the support member 3. This can increase the durability of the solar module 4. Further, this also can prevent dust, dirt, and the like from being adhered on the surface of the solar module 4.

The number of solar modules 4 and/or the arrangement thereof may be freely changed to obtain necessary electromotive force.

A space S is present between the support member 3 and the window glass 12. The presence of the space S can prevent heat generated by the solar module 4 from being directly transmitted to the window glass 12 and can prevent heat cracking or the like of the window glass 12. Further, the space S contributes to moderating transmission of outside air temperature to indoors and this can increase heat insulation.

The space S is not necessarily hermetically sealed. For example, the support member 3 may have breathability and a gap may be provided between the support member 3 and the frame member 2. Having the space S not hermetically sealed can prevent heat generated by the solar module 4 from being accumulated in the space S and can prevent the power generation efficiency of the solar module 4 from being degraded. A net-like or spongy breathable member may be arranged in the gap between the support member 3 and the frame member 2 to prevent dust from getting into the space S.

The wiring 5 electrically connects the solar modules 4 via their respective negative electrodes 4*b* and positive electrodes 4*a*. The wiring 5 may be detachably arranged on the support member 3, or may be embedded in the support member 3. The wiring 5 has a shape according to the number of solar modules 4 and/or the shape thereof. Here, the shape of the solar module 4 include the positions of the electrodes 4*a* and 4*b* of the solar module 4.

The terminal 6 (6_1, 6_2) is a terminal for electrically connecting the solar module 4 to the terminal 7 (7_1, 7_2) of the frame member 2. The terminal 6_1 and the terminal 6_2 are arranged on the support member 3 so that the terminal 6_1 contacts the electrode 4a_1 of the solar module 4_1 and the terminal 6_2 contacts the negative electrode 4b_2 of the solar module 4_2. The terminal 6 (6_1, 6_2) may be a clip-type terminal that clips the support member 3. The terminal 6 may be detachably arranged on the support member 3. The terminal 6 may be arranged at an edge of the support member 3 so that part or the whole thereof is invisible from outside in a state where the support member 3 is fixed onto the frame member 2. For example, when the support member 3 is fixed by the groove G of the frame member 2, the terminal 6 may be arranged so as to be hidden by the groove G. This can improve the designability of the solar module system 1.

The terminal 7 (7_1, 7_2) is a terminal for taking out an output of the solar module 4 to outside. The terminal 7 is arranged on the frame member 2 so as to contact the terminal 6 (6_1, 6_2) when the support member 3 is fixed onto the frame member 2. The terminal 7 may be arranged in the groove G of the frame member 2. This lowers the visibility of the terminal 7, which can improve the designability of the solar module system 1.

According to the variation of the number of solar modules 4 and/or the shape thereof, the position of the terminal 6 has to be different. Therefore, the terminal 6 may be arranged at any point of the support member 3. In addition, the terminal 7 also may be arranged at any point of the frame member 2 according to the position of the terminal 6. For example, a rail (not illustrated) may be provided on the groove G so as to allow the terminal 7 to move on the rail.

The wiring 8 is wiring for taking out an output of the solar module 4 from the terminal 7 to outside. The wiring 8 electrically connects the terminal 7 and the junction box 9.

The junction box 9 integrates outputs from a plurality of solar module systems 1. In FIG. 1, the junction box 9 is arranged outside the frame member 2. However, this does not limit the arrangement of the junction box 9 and the junction box 9 may be arranged inside the frame member 2. In this case, the wiring 8 is also arranged inside the frame member 2. This can improve the designability in comparison with a case where the junction box 9 is arranged outside the frame member 2.

<Method of Mounting Support Member 3>

Next, an example of fixing the support member 3 onto the frame member 2 will be described with reference to FIGS. 5A to 5C. Here, a state where the support member 3 is fixed onto the frame member 2 includes a state where the support member 3 is loosely fit to the groove G of the frame member 2. The window 10 is not illustrated to avoid complication.

Figure 5C:
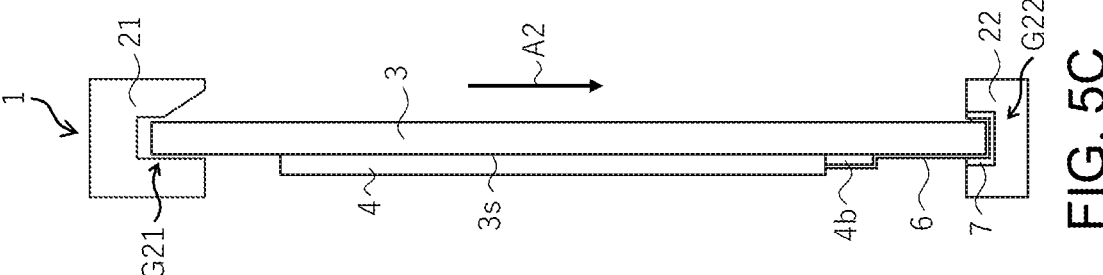
FIGS. 5A to 5C each is a cross-sectional view that illustrates a method of mounting the support member.
Figure 5B:
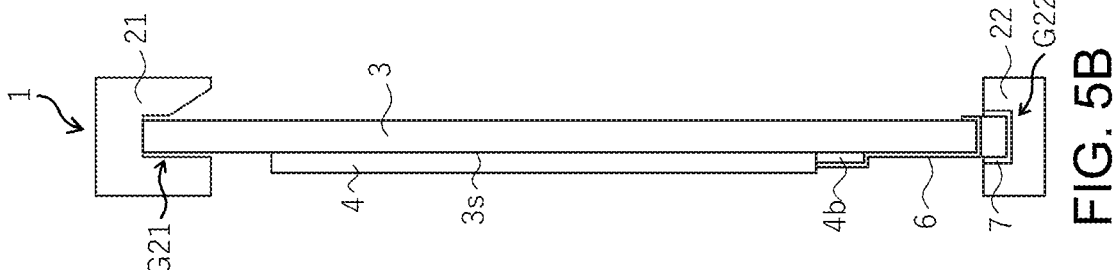
Figure 5A:
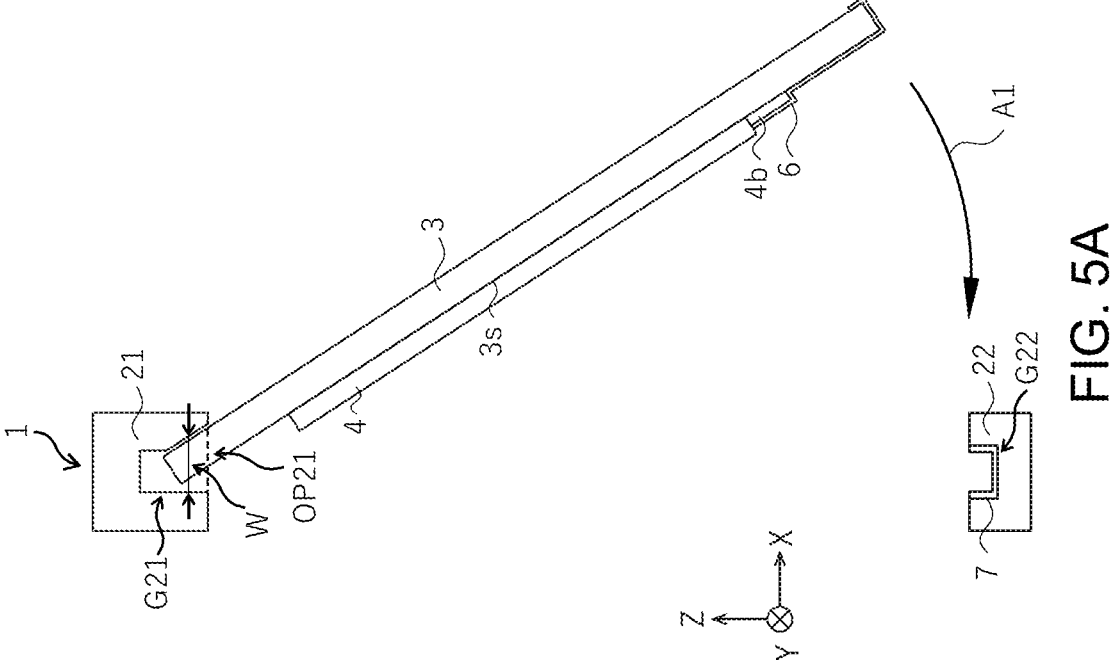

As illustrated in FIGS. 5A to 5C, the groove G21 of the side part 21 of the frame member 2 is formed so that a width W of the groove G21 at at least part of the groove G21, the part including the opening OP 21, that is to say, the width on an opening side of the groove G21, is larger in a direction opposite to the depth direction of the groove G21. In addition, the groove G21 is deeper than the groove G22. The following describes how to fix the support member 3 onto the frame member 2 with reference to FIGS. 5A to 5C.

First, one side part out of edge sides of the support member 3 is inserted into the opening OP2 of the groove G21 of the side part 21 of the frame member 2. Then, while the support member 3 is being slid via the groove G21 in the direction of the side part 21, another side part that opposes to the one side part of the support member 3 is moved in the direction of the side part 22 (direction of an arrow A1). That is, the support member 3 is rotated in the direction of the arrow A1, with the groove G 21 as an axis (see FIG. 5A.).

The above operation makes the support member 3 parallel to the window glass 12 (window 10) (see FIG. 5B). Since the groove G21 is deeper than the groove G22, the support member 3 is engaged only in the groove G21 in this state.

Next, the support member 3 is moved in the direction from the side part 21 to the side part 22 (direction of an arrow A2), to engage the other side part of the support member 3 into the groove G22 (see FIG. 5C.). Since the groove G21 is deeper than the groove G22, the support member 3 does not come off from the groove G21 when the support member 3 is moved in the direction of the arrow A2. The above series of operations makes the support member 3 fixed onto the frame member 2 by the groove G21 and the groove G22. To remove the support member 3 from the frame member 2, the above series of operation is performed in inverse order.

The side part 21 may be a side part on a side opposite to the gravity direction. In removing the support member 3 from the frame member 2, it is necessary to perform the operation of moving the support member 3 in a direction opposite to the arrow A2. Therefore, when the side part 21 is on a side opposite to the gravity direction, the above operation is performed in a direction opposite to the gravity direction and this can prevent the support member 3 from being spontaneously detached from the frame member 2 due to vibration or the like.

After the above series of operations, the support member 3 may be firmly fixed onto the frame member 2 by a screw or the like. Firmly fixing the support member 3 onto the frame member 2 can prevent deformation of the support member 3.

In addition, the above-described mounting method does not necessitate removing the frame member 2 from the window 10 and therefore, the support member 3 can be fixed while the frame member 2 is being fixed onto the window 10. Furthermore, also in removing the support member 3 from the frame member 2, the support member 3 can be removed while the frame member 2 is being fixed onto the window 10.

The support member 3 may be fixed onto the frame member 2 in a way other than that described above. In one possible example, the frame member 2 is separated into a plurality of pieces in the Z-axis direction or another direction and after the support member 3 is housed in the grooves of the frame member 2, the frame member 2 is recombined to fix the support member 3 onto the frame member 2.

As described above, according to the embodiment, a solar module system that can be installed and removed without interfering with an already installed window can be provided. In addition, a solar module can be easily detachably mounted on a window without requiring much work. This allows the solar module 4 to be easily replaced when it becomes defective.

In addition, the solar module 4 and the terminal 6 may be detachable from the support member 3 and in this case, it is possible to replace only the solar module or only the terminal.

Furthermore, since the solar module system is easily detachable, this embodiment is effective even in a case where the solar module is not intended to be placed at the same location for a long period of time, such as when the module is installed in a rental property.

First Modification

Figure 6:
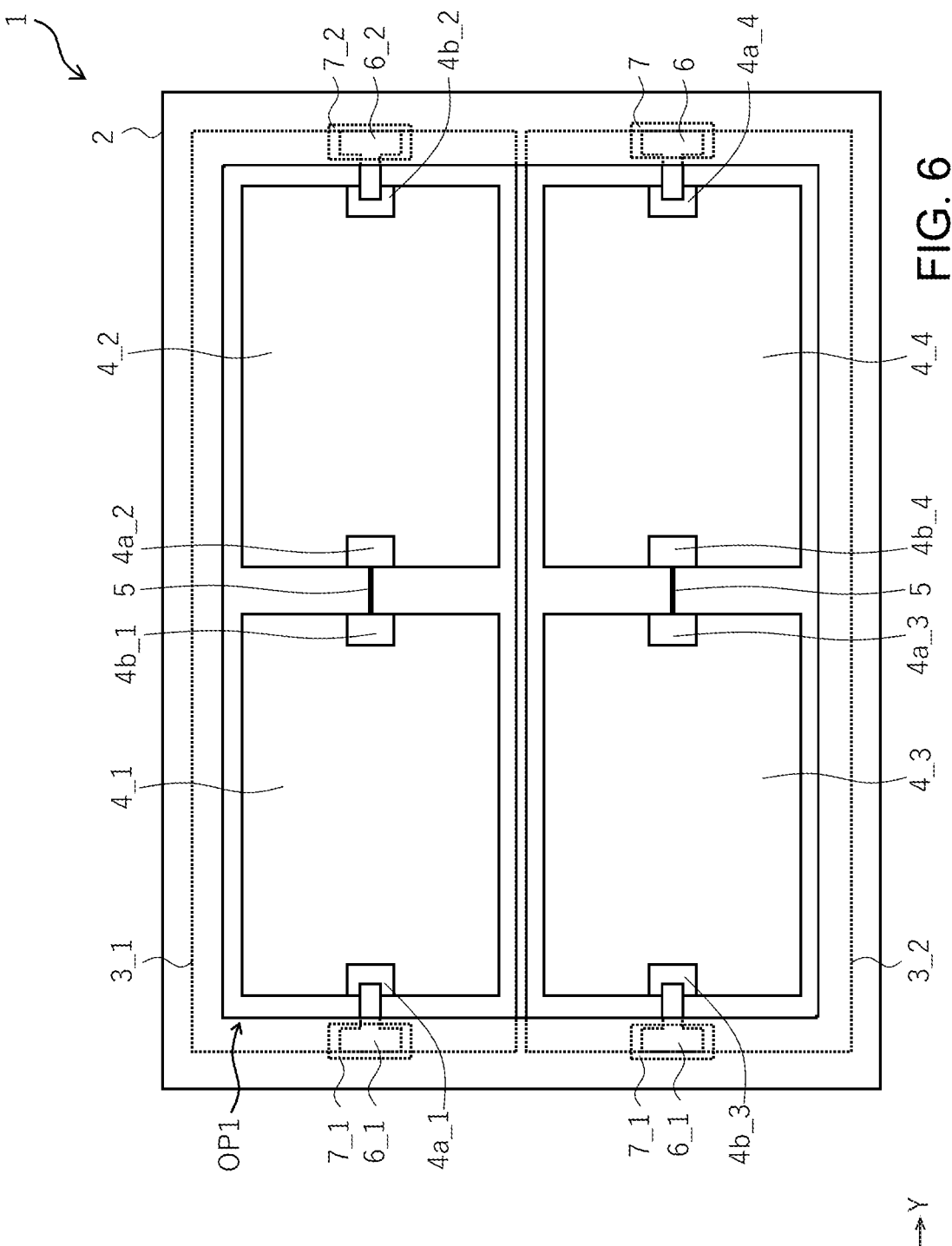
FIG. 6 is a cross-sectional view that illustrates another example of the solar module system according to the embodiment.

Next, a first modification of the embodiment will be described with reference to FIG. 6. In FIG. 1, the support member 3 is comprised of one piece; however, the support member 3 may be comprised of a plurality of pieces. FIG. 6 is a front view of the solar module system 1 that includes two support members 3. In an example illustrated in FIG. 6, solar modules 4_1, 4_2 and solar modules 4_3, 4_4 are arranged on two support members 3_1, 3_2, respectively. In the case of a support member 3 comprised of one piece, when the solar module system 1 becomes bigger, the support member 3 also becomes bigger and heavier and this increases the burden on a user who attaches/detaches the solar module system 1. On the other hand, by using the support member 3 comprised of a plurality of pieces, each of the support members 3 can be smaller and this can reduce the burden on a user who attaches/detaches the support members 3 to/from the frame member 2.

Second Modification

Figure 7:
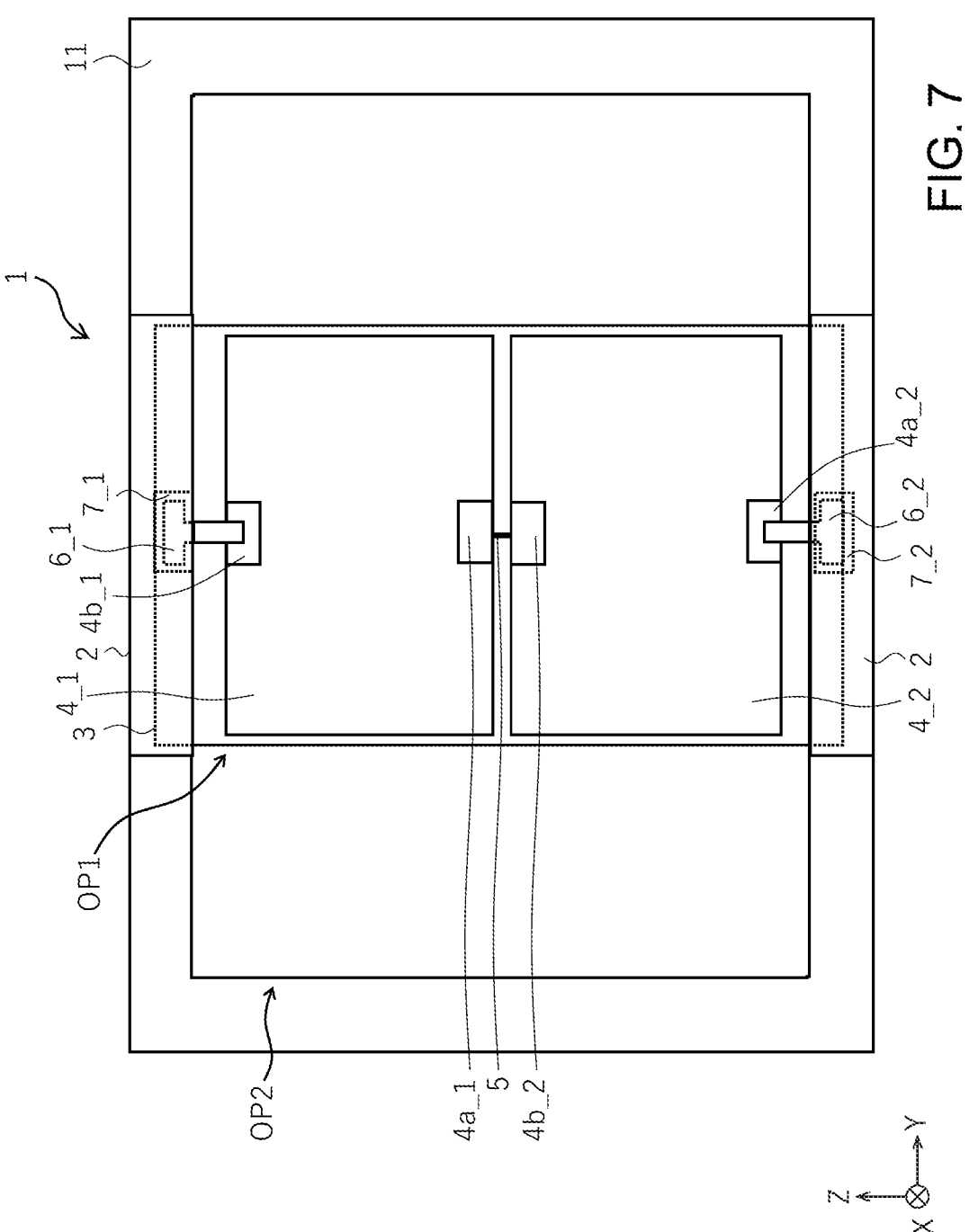
FIG. 7 is a front view that illustrates still another example of the solar module system according to the embodiment.

Next, a second modification of the embodiment will be described with reference to FIG. 7. In FIG. 1, the area of the opening OP1 of the frame member 2 is almost the same as the area of the opening OP2 of the window frame 11 and the solar module system 1 is installed so as to cover the whole surface of the opening OP2. However, as illustrated in FIG. 7, the solar module system 1 may be arranged so as to cover only part of the opening OP2, that is, only part of an exposed transparent member. More specifically, the area of the opening OP1 may be smaller than the area of the opening OP2 and the shape of the opening OP1 may be such as to fit within the opening OP2. This makes it possible to use part of the window 10 for its original purpose.

Third Modification

Next, a third modification of the embodiment will be described with reference to FIG. 8. When a user with no expertise places the solar module 4, a short circuit of the solar module 4 may occur due to placement in a wrong orientation (for example, upside down or reversely).

Figure 8:
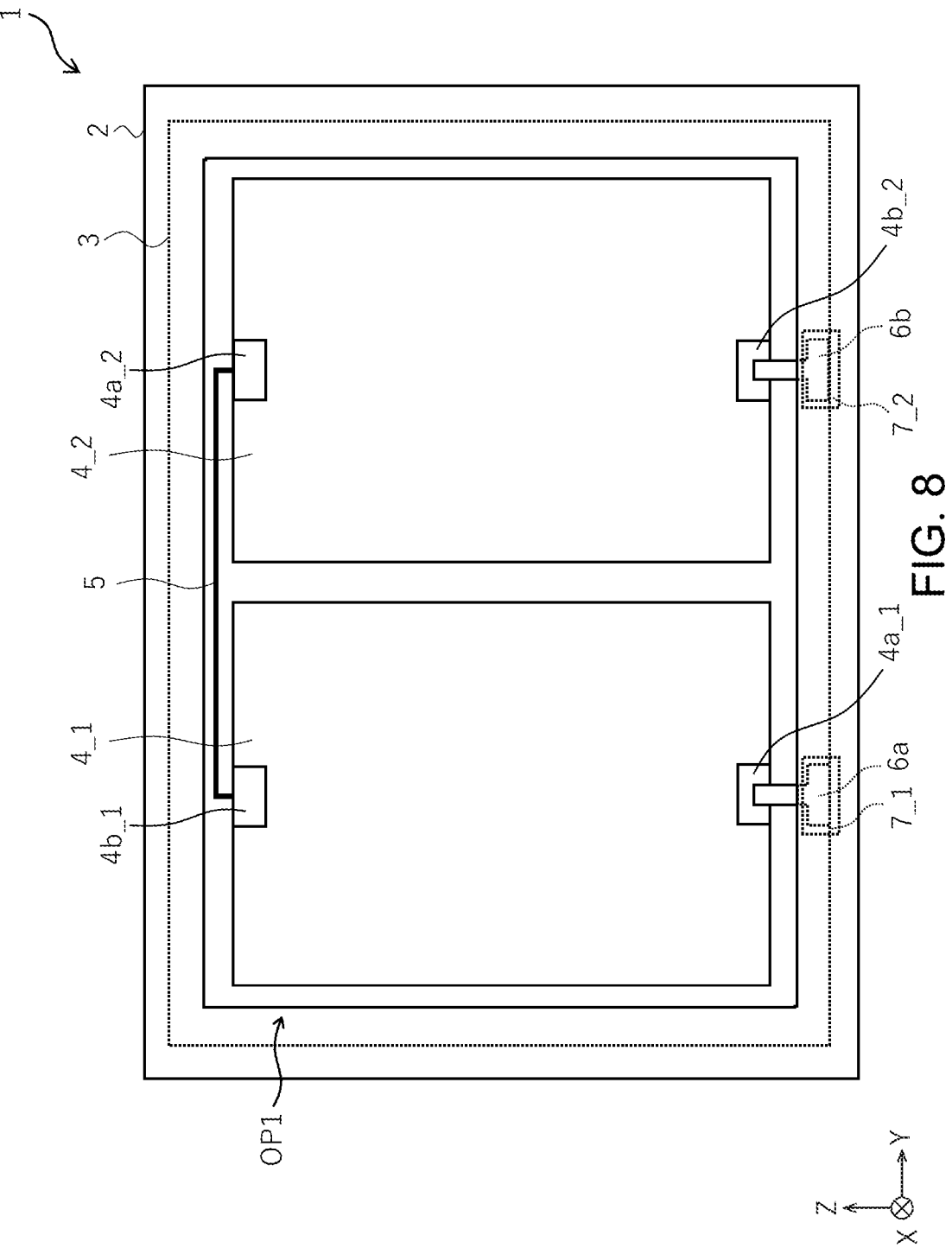
FIG. 8 is a front view that illustrates still another example of the solar module system according to the embodiment.

FIG. 8 illustrates a solar module system 1 of the third modification. As the terminal 6, a terminal (positive-electrode side terminal) 6a and a terminal (negative-electrode side terminal) 6b that have mutually different shapes are provided. The terminal 6a is connected with the positive electrode 4a_1 of the solar module 4. The terminal 6b is connected with the negative electrode 4b_2 of the solar module 4.

Figure 9A:
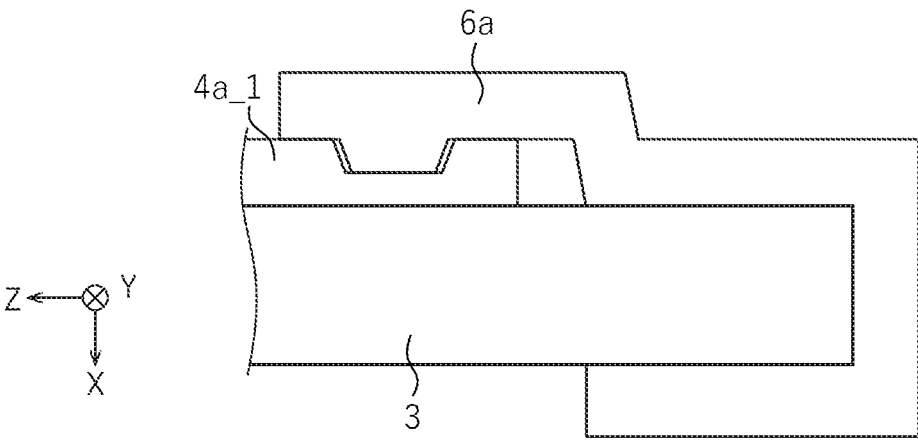
FIG. 9A and FIG. 9B are enlarged cross-sectional views of contact parts between electrodes of solar modules and terminals in the solar module system illustrated in FIG. 8.
Figure 9B:
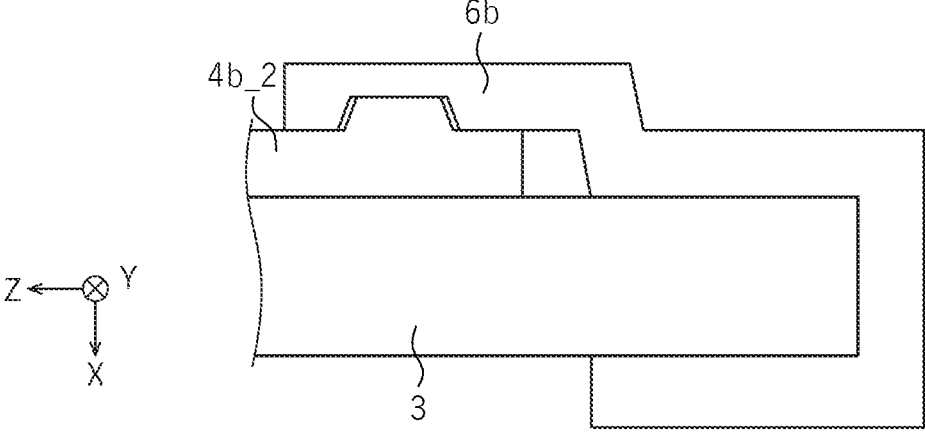

FIG. 9A and FIG. 9B are enlarged cross-sectional views of a contact part between the electrode 4a_1 and the terminal 6a and a contact part between the electrode 4b_2 and the terminal 6b of the solar module system 1 illustrated in FIG. 8. As illustrated in FIG. 9A, the positive electrode 4a_1 has a concave part and the terminal 6a has a convex part, for example. Similarly, as illustrated in FIG. 9B, the negative electrode 4b_2 has a convex part and the terminal 6b has a concave part.

This allows the shape of the terminal 6a and the shape of the positive electrode 4a_1 to fit each other and the shape of the terminal 6b and the shape of the negative electrode 4b_1 to fit each other; and does not allow the shape of the terminal 6a and the shape of the negative electrode 4b_2 to fit and the shape of the terminal 6b and the shape of the positive electrode 4a_1 to fit.

According to the above configuration, even when an attempt is made to place the solar module 4 in a wrong orientation, the terminal 6a or the terminal 6b does not fit the negative electrode 4b_2 or the positive electrode 4a_1 and therefore, the terminal 6a or the terminal 6b cannot be arranged, which allows a user to recognize that the orientation of the solar module 4 is wrong. This can prevent the solar module 4 from being short-circuited. It is noted that the shapes of the electrodes 4a_1, 4b_2 and the shapes of the terminals 6a, 6b are not limited to those in the above description.

Next, a fourth modification of the embodiment will be described with reference to FIG. 10 and FIG. 11. In light of designability and the like, it may be desirable that the solar module system 1 be made more compact (thinner) so that the solar module system 1 does not occupy the space.

Figure 10:
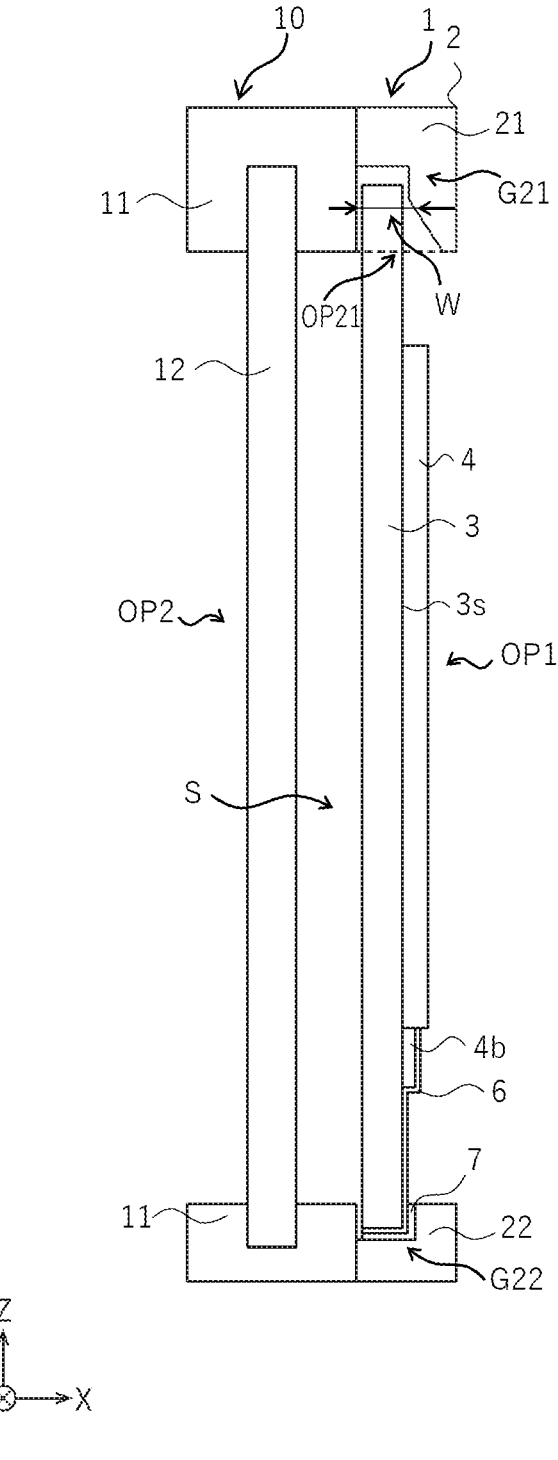
FIG. 10 is a cross-sectional view of the solar module system according to a fourth modification.

In this modification, when the frame member 2 is arranged on the window frame 11 or the window glass 12, grooves G21, G22 are formed between the frame member 2 and the window frame 11 as illustrated in FIG. 10. Alternatively, according to the shape of the window 10, grooves G21, G22 are formed between the frame member 2 and the window glass 12 as illustrated in FIG. 11.

Figure 11:
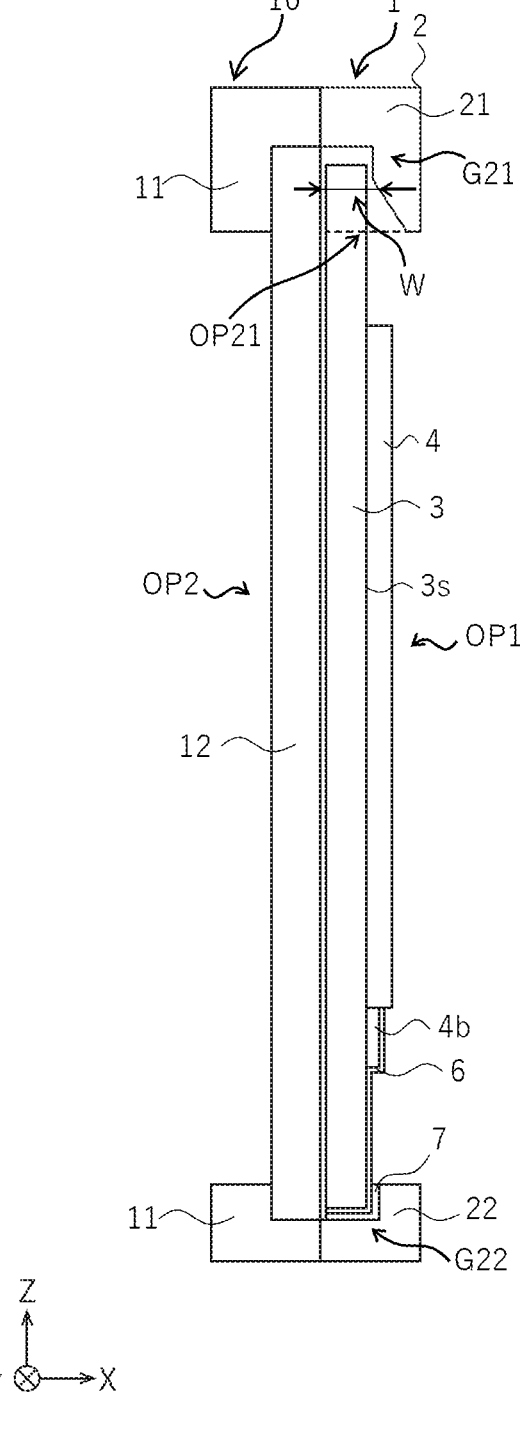
FIG. 11 is a cross-sectional view of another example of the solar module system according to the fourth modification.

In either of FIG. 10 or FIG. 11, the above-described structure of the frame member 2 allows a reduction of the width of the frame member 2 in the X-axis direction, which makes it possible to reduce the thickness of the whole of the solar module system 1. A distance (space S) between the window glass 12 and the support member 3 is small and therefore, to prevent heat generated by the solar module 4 from being transmitted to the window glass 12, the support member 3 is arranged so that the principal surface 3s on which the solar module 4 is arranged is on the room side (an opposite side to the window glass 12). That is, the solar module 4 is arranged on the room side of the support member 3. At this time, the support member 3 may be in contact with the window glass 12. In the examples of FIG. 10 and FIG. 11, the principal surface 3s of the support member 3 is on the room side (an opposite side to the window glass 12); however, the principal surface 3s may be on the window glass 12 side.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The embodiments as described before may be configured as below.

Clauses

Clause 1. A solar module system comprising:
a support member that has a principal surface;
a solar module arranged on the principal surface;
a first terminal arranged on the support member and electrically connected with an electrode of the solar module;
a frame member configured to hold the support member such that the solar module opposes to a transparent member; and
a second terminal arranged on the frame member and electrically connected with the first terminal of the support member being held by the frame member.

Clause 2. The solar module system according to clause 1, wherein
the support member is square-shaped;
the frame member is square-shaped;
the frame member has a first side part and a second side part facing the first side part, and has grooves formed on at least both the first side part and the second side part; and
the support member is held by the frame member by being engaged into the groove.

Clause 3. The solar module system according to clause 2, wherein
the second terminal is arranged in the groove formed on the second side.

Clause 4. The solar module system according to clause 2 or 3, wherein
a width of a first groove, the first groove being the groove formed on the first side part, becomes larger at least partially on an opening side of the first groove toward a side opposite to a depth direction of the first groove; and
the first groove formed on the first side part, is deeper than the second groove formed on the second side part.

Clause 5. The solar module system according to clause 4, wherein
the first side part is a side part on a side opposite to the gravity direction.

Clause 6. The solar module system according to any one of clauses 1 to 5, wherein
the first terminal includes:
a positive-electrode side first terminal that is electrically connected with a positive electrode of the solar module; and
a negative-electrode side first terminal that is electrically connected with a negative electrode of the solar module; and wherein
a shape of the positive-electrode side first terminal and a shape of the positive electrode fit each other;
a shape of the negative-electrode side first terminal and a shape of the negative electrode fit each other;
the shape of the positive-electrode side first terminal and the shape of the negative electrode do not fit; and
the shape of the negative-electrode side first terminal and the shape of the positive electrode do not fit.

Clause 7. The solar module system according to any one of clauses 1 to 6 comprising a plurality of the support members.

Clause 8. The solar module system according to any one of clauses 1 to 7, wherein
an area of an opening of the frame member is smaller than an area of the transparent member.

Clause 9. The solar module system according to any one of clauses 1 to 8, wherein
the transparent member is window glass.

Clause 10. The solar module system according to any one of clauses 1 to 9, wherein
the support member includes at least one of polycarbonate, vinyl chloride, and polyimide.

Clause 11. The solar module system according to any one of clauses 1 to 10, wherein
a thickness of the support member is 1 mm or more and 50 mm or less.

Clause 12. The solar module system according to any one of clauses 1 to 11, wherein
the support member includes a reinforcement member along at least either a diagonal line or side part of the support member.

Clause 13. A solar system comprising:
a plurality of the solar module systems according to any one of clauses 1 to 12;
a junction box configured to integrate outputs from the plurality of the solar module systems; and
wiring configured to electrically connect the second terminal and the junction box.

Clause 14. A method of mounting a support member, wherein
the support member is held by a frame member;
the support member has a solar module arranged on a principal surface thereof and includes a first terminal that is electrically connected to an electrode of the solar module;
the frame member holds the support member so that the solar module opposes to a transparent member;
the frame member has a first side part and a second side part that opposes to the first side part;
a first groove is formed on the first side part and a second groove is formed on the second side part;
a width of the first groove becomes larger at least partially on a side of an opening of the first groove in a direction opposite to a depth direction of the first groove; and
the first groove is deeper than the second groove,
the method of mounting the support member comprising:
inserting one side part out of edge sides of the support member into the opening of the first groove;
moving another side part that opposes to the one side part in a direction of the second side part of the frame member, the other side part being one of the edge sides of the support member, the moving being performed while the one side part of the support member is being slid via the first groove in a direction of the first side part of the frame member; and
engaging the other side part of the support member into the second groove of the frame member by moving the support member in a direction from the first side part to the second side part.

The invention claimed is:

1. A solar module system comprising:
a support member that has a principal surface;
a solar module arranged on the principal surface;
a first terminal provided on the support member and electrically connected with an electrode of the solar module;
a frame member configured to hold the support member such that the solar module is disposed to face a transparent member; and
a second terminal provided on the frame member and electrically connected with the first terminal of on the support member, the support member being held by the frame member,
wherein
the support member is square-shaped;
the frame member is square-shaped;
the frame member has a first side part and a second side part facing the first side part, and has grooves formed on at least both the first side part and the second side part;
the support member is held by the frame member by being engaged into the groove;
the second terminal is arranged in the groove formed on the second side part;
a width of a first groove formed on the first side part becomes larger at least partially on an opening side of the first groove toward a direction opposite to a depth direction of the first groove; and the first groove formed on the first side part is deeper than a second groove formed on the second side part.

2. The solar module system according to claim 1, wherein the first side part is a side part on a side opposite to a direction of gravity.

3. A solar module system, comprising:

a support member having a principal surface;

a solar module arranged on the principal surface;

a first terminal provided on the support member and electrically connected with an electrode of the solar module;

a frame member configured to hold the support member such that the solar module is disposed to face a transparent member; and a second terminal provided on the frame member and electrically connected with the first terminal on the support member, the support member being held by the frame member, wherein the first terminal includes:

a positive-electrode side first terminal that is electrically connected with a positive electrode of the solar module; and a negative-electrode side first terminal that is electrically connected with a negative electrode of the solar module; and wherein a shape of the positive-electrode side first terminal and a shape of the positive electrode fit each other;

a shape of the negative-electrode side first terminal and a shape of the negative electrode fit each other;

the shape of the positive-electrode side first terminal and the shape of the negative electrode do not fit; and the shape of the negative-electrode side first terminal and the shape of the positive electrode do not fit.

4. The solar module system according to claim 1 comprising a plurality of the support members.

5. The solar module system according to claim 1, wherein an area of an opening of the frame member is smaller than an area of the transparent member.

6. The solar module system according to claim 1, wherein the transparent member is window glass.

7. The solar module system according to claim 1, wherein the support member includes at least one of polycarbonate, vinyl chloride, and polyimide.

8. The solar module system according to claim 1, wherein a thickness of the support member is 1 mm or more and 50 mm or less.

9. The solar module system according to claim 1, wherein the support member includes a reinforcement member that extends along at least a diagonal line of the support member or a side part of the support member, the reinforcement member being disposed on a surface of the support member or embedded inside the support member.

10. A solar system comprising:

a plurality of the solar module systems according to claim 1;

a junction box configured to integrate outputs from the plurality of the solar module systems; and wiring configured to electrically connect the second terminal and the junction box.

* * * * *